United States Patent [19]

Alaiwan et al.

[11] Patent Number: 5,235,700

[45] Date of Patent: Aug. 10, 1993

[54] CHECKPOINTING MECHANISM FOR FAULT-TOLERANT SYSTEMS

[75] Inventors: Haissam Alaiwan, Cagnes sur Mer; Jean Calvignac, La Gaude; Jacques-Louis Combes; Andre Pauporte, both of La Colle sur Loup; Claude Basso, Nice; Francois Kermarec, Antibes, all of France

[73] Assignee: International Business Machines Corporation, Armonk, N.Y.

[21] Appl. No.: 641,833

[22] Filed: Jan. 16, 1991

[30] Foreign Application Priority Data

Aug. 2, 1990 [EP] European Pat. Off. ........ 89480021.6

[51] Int. Cl.⁵ .............................................. G06F 11/16
[52] U.S. Cl. ...................................... 395/575; 371/91; 371/11.3
[58] Field of Search .................. 395/575; 371/9.1, 8.1, 371/11.3

[56] References Cited

FOREIGN PATENT DOCUMENTS 0143125 5/1985 European Pat. Off. .
0260625 3/1988 European Pat. Off. .
0299511 1/1989 European Pat. Off. .

Primary Examiner—Vincent P. Canney
Attorney, Agent, or Firm—Joscelyn G. Cockburn

[57] ABSTRACT

A device which switches data processing from an active processor, about to fail, to a back-up processor includes a memory change detector which captures memory changes in the memory of the active processor and a mirroring control circuit which causes the memory changes when committed by establishing recovery point signals generated by the active processor to be dumped into the memory of the back-up processor so that the back-up processor resumes operation of the active processor from the last established recovery point.

9 Claims, 9 Drawing Sheets

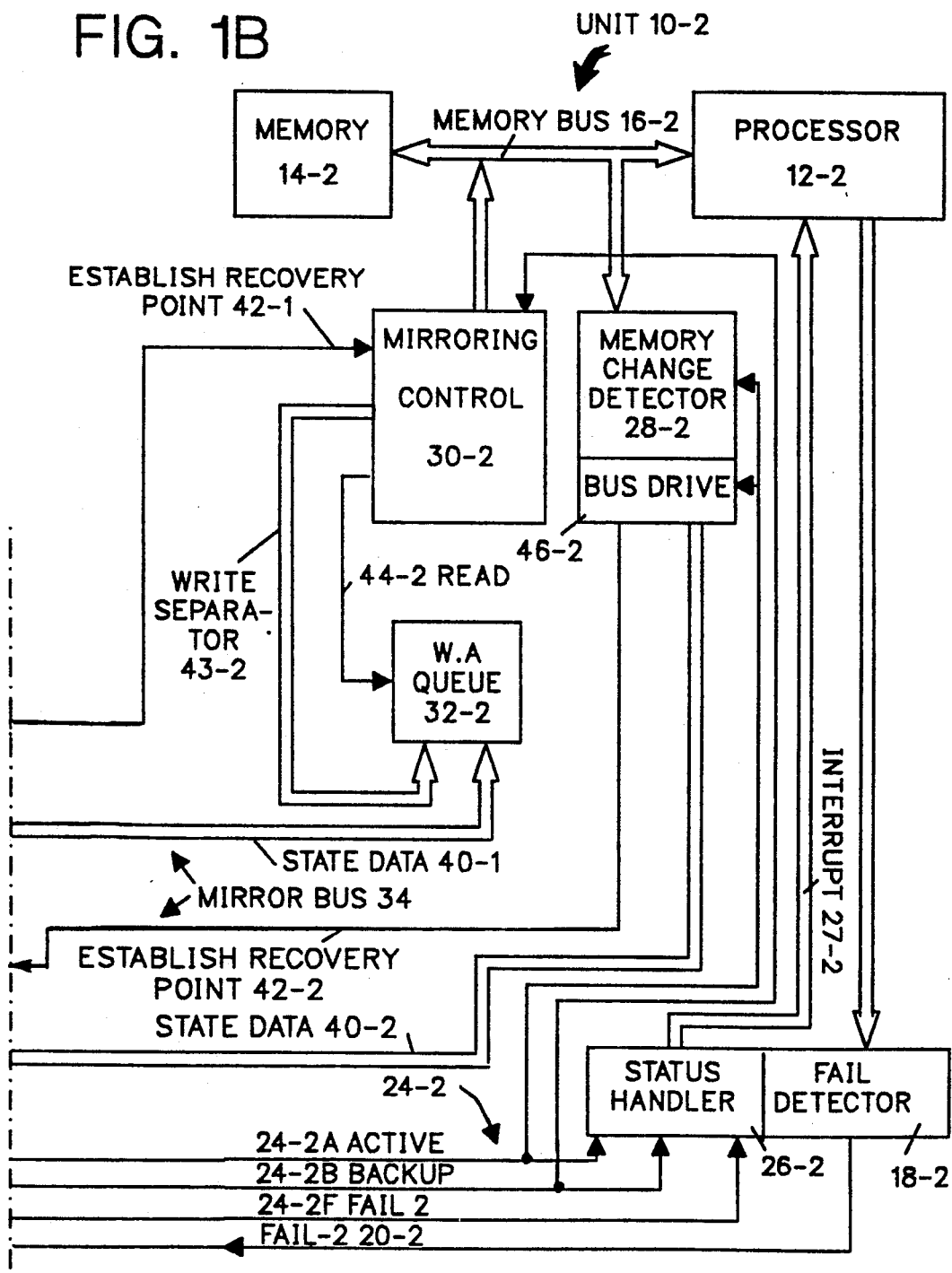

CHECKPOINTING MECHANISM FOR FAULT-TOLERANT SYSTEMS

DESCRIPTION OF THE INVENTION

1. Field of the Invention

The present invention relates to a checkpointing mechanism for providing information processing systems with fault tolerance capabilities.

2. Background Art

Fault-tolerance is an emerging requirement in the information processing systems such as processors or communication controllers. These machines have to be designed so as to minimize the failure rate, improve the failure diagnostics and localizations so as to minimize the repair times. However, hardware and software failures lead most of the time to a machine disruption.

The availability requirements for machines such as the communication controllers become more and more drastic since these machines should provide their intended services, as viewed by the user twenty four hours a day without any interruption. As there is no means to prevent the hardware failures, the machine must be designed so that the failures do not disrupt the service. The so-designed machines are said to be fault-tolerant.

Such machines already exist. They are essentially based on two different concepts.

Machines based on the first concept make use of tightly coupled units which synchronously execute the same program instructions. Examples of such machines are described in U.S. Pat. No. 4,654,857 and European patent application 286,856.

A major drawback of this type of machines results from the fact that a perfect synchronism has to be maintained between the duplicated units. In addition, an instantaneous detection of the faults is required.

On the contrary, the machines based on the second concept make use of an active unit associated to a backup unit. The backup unit is dormant and replaces the active unit in case of failure.

Examples of such machines are described in French Patent 2,261,568. It is also used in the Tandem NON-STOP systems.

French Patent 2,261,568 describes a multiprocessor configuration wherein a faulty processor can be replaced by a backup processor. When the failure is detected, a control unit saves information from which the other processor can execute the tasks of the failing processor. This system does not provide any means to place the backup processor in the state of the active processor before the failure detection. In addition, some failures can prevent the failing processor state from being saved.

In the Tandem NONSTOP systems, the backup processor is provided with a copy of the data of the task executed by the active primary processor. Periodically, it receives a message indicative of the primary processor status. In order that the backup processor receives the copy of the data of the task executed by the primary processor, it is required that the task executed in the primary processor sorts the data it has handled and sends the sorted data to the backup processor. This sorting process is complex and results in an overhead which is unacceptable in a real time system such as a communication controller.

OBJECTS OF THE INVENTION

An object of the invention is to provide an improved checkpointing mechanism for a fault tolerant system comprised of active units and backup units, which does not degrade the performance of the active unit.

Another object of the invention is to provide such a mechanism which is transparent for the tasks executed in the active units.

Another object of the invention is to provide such a mechanism which does not add to the complexity of the system software.

SUMMARY OF THE INVENTION

The checkpointing mechanism according to the subject invention allows the working process of an active processor to be resumed by a backup processor when the active processor is failing. This mechanism is associated with at least one pair of information processing units comprising a first and a second information processing units. Each information processing unit includes a processor for running a program stored in a memory. This memory is attached to the processor through a memory bus comprising data, address and control lines, or it is comprised of a shared memory to which all of a plurality of processors are connected by an interconnection network. The processors can be set in an active, backup or fail status under control of a configuration controller responsive to failure detecting means associated to each processor and detecting whether the associated processor is failing or not. The checkpointing mechanism comprises:

first memory change detecting means associated with at least the information processing unit whose processor is initially set in the active status by the configuration controller to receive the address and data on the memory bus causing the memory content to be changed and generate memory change records therefrom, first signalling means in said information processing unit whose processor is initially set in the active status by the configuration controller, responsive to a signal provided by said processor at selected points of the program to generate an establish recovery point signal, first storing means associated with at least the information processing unit whose processor is initially set in the backup status by the communication controller, said first storing means being coupled to said first memory change detecting means to store the memory change records received from said first memory change detecting means, first control means associated with said first storing means and responsive to the establish recovery point signal received from the first signalling means to cause a separating record to be stored in the first storing means and the memory change records to be read from the first storing means and written in the memory of the information processing system whose processor is initially set in the backup status, as long as separating records are stored in the first storing means, whereby when set in an active status, the backup processor can resume the working process of the active status processor when its status is switched from the active status to the fail status.

DETAILED DESCRIPTION OF THE INVENTION

For a better understanding of the invention, the checkpointing mechanism will first be completely described in relation to FIGS. 1 to 6, in a configuration comprising two processing units backing-up each other, and each of which includes a processor and a dedicated memory. Then, the invention will be generalized and applied to a plurality of processor pairs connected through an interconnection network (FIG. 7) and further, to a plurality of processors sharing a common intelligent memory (FIG. 8).

The mechanism according to the subject invention allows fault tolerance to be implemented in a multiprocessor system comprising multiple interconnected and identical processors. It makes use of a duplex redundancy scheme, i.e. the system comprises processor pairs. In each pair one processor is active i.e it effectively performs the processing work while the other one called the backup processor is dormant and activated only in case its companion processor fails. It is assumed that the switching is dynamic.

According to the invention, a program roll-back technique is used which allows the system to recover from a failure in an active processor by restarting the processing work in a backup processor at a previously reached point of the processing work. Recovery points are distributed along the processing path and the state of the processor at these recovery points is saved. The state of the processor comprises the set of all the variables present in the processor memory, registers or even in some part of the hardware, which affect the future processor behavior.

The state of an processor is saved in a memory device whose failures are not correlated with the failures of the active processor. The state can thus be retrieved by the backup processor. The processing is therefore sliced into successive computing stages bounded by two successive recovery points.

The processors have a failstop design which means that a failure causes a processor to stop working and suspend any external actions.

In such an environment the main problem to be solved consists in the establishment of synchronization points between the active and backup processors.

Also, the detection of the failures and the taking over by the backup processor have to be performed. A number of conditions should be met to ensure that the active processor is indeed unoperational allowing the backup processor to resume the operations.

Figure 1A:
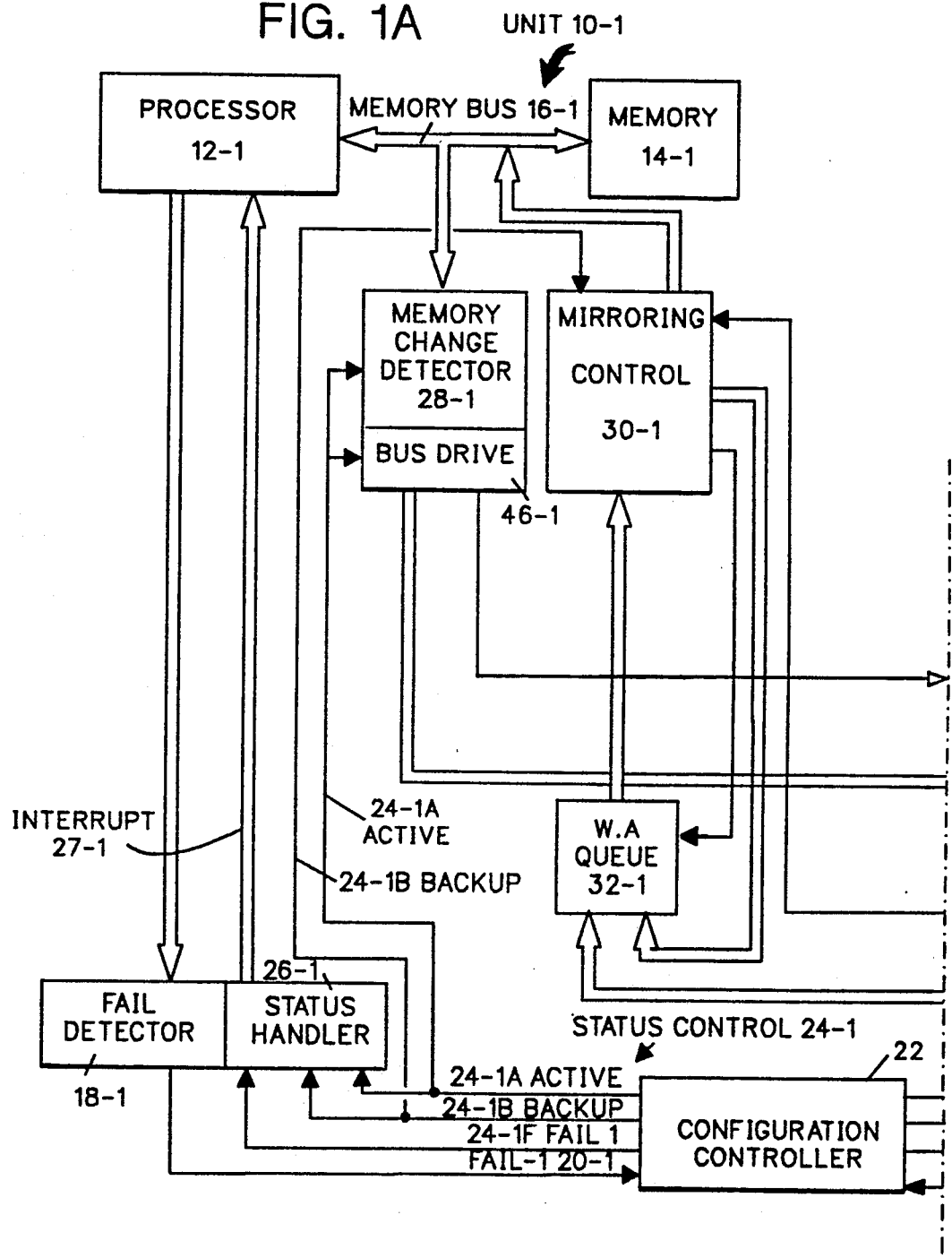
FIG. 1 consisting of FIGS. 1A and 1B, represents the block diagram of checkpointing mechanism according to the subject invention when implemented in a system comprising two units.

FIG. 1 represents the mechanism of the present invention when implemented in a system comprising only one pair of data processing units 10-1 and 10-2.

Each unit comprises a processor 12 working under control of a control program stored in a memory 14. The processors and memories are referenced 12-1 and 14-1 in unit 10-1 and 12-2 and 14-2 in unit 10-2. The same control program is loaded into memories 14-1 and 14-2.

The memories 14-1 and 14-2 are attached to processors 12-1 and 12-2 through memory busses 16-1 and 16-2 respectively, comprising address, data and control wires as is conventional.

Failure detector devices 18-1 and 18-2 which may be of any known type are arranged to detect the processor failures and generate an active signal on FAIL 1 line 20-1 or FAIL 2 line 20-2 when they detect a failure in processor 12-1 or 12-2, respectively.

In FIG. 1, the failure detector circuits have been represented outside the processors for the sake of explanation. In fact, these failure detector circuits comprise a plurality of checkers such as parity checkers, power failure detectors, etc.. located at selected points inside the processors.

Each processor can be in any status called ACTIVE, BACKUP or FAIL status, as assigned by a configuration controller 22, which determines the processor status from the status of the FAIL signals it receives from the lines 20-1 and 20-2. In response to these signals, the configuration controller generates status control signals on busses 24-1 and 24-2 which are provided to status handler circuits 26-1 and 26-2 in the systems 10-1 and 10-2 respectively, which causes said systems to be set in a given status by means of processor control signals on busses 27-1 and 27-2.

The detected failures which are reported to the configuration controller 22 order a switch over of the status of the failing processor from ACTIVE to FAIL status and that of its companion from BACKUP to ACTIVE status.

Depending upon the status of the FAIL-1 and FAIL-2 lines 20-1 and 20-2, configuration controller 22 activates one line of busses 24-1 and 24-2. An active signal on line 24-1A or 24-2A is intended to set processor 12-1 or 12-2 in the ACTIVE status. An active signal on lines 24-1B or 24-2B is intended to set processor 12-1 or 12-2 in the BACKUP status. Active signals on lines 24-1F and/or 24-2F are intended to set processors 12-1 and/or 12-2 in the FAIL status.

The mechanism according to the present invention comprises memory change detectors 28-1 and 28-2 and mirroring control circuits 30-1 and 30-2 in the units 10-1 and 10-2 respectively. It also comprises a mirror bus 34 which is the dedicated path between units 10-1 and 10-2 for transferring the state data between the active processor and its backup processor as will be explained later on.

The operation of the checkpointing mechanism will be described assuming that unit 10-1 is the active unit and unit 10-2 is the backup unit. The control signal from line 24-1A which sets processor 12-1 in its ACTIVE status is provided to memory change detector 28-1 and the control signal from line 24-1B which sets processor 12-1 to its backup status is provided to mirroring control circuit 30-1 to cause the memory change detector 28-1 to be activated and mirroring control circuit 30-1 to be inactive, when unit 10-1 is active.

Conversely, in unit 10-2, the memory change detector 28-2 is inactive and the mirroring control circuit 30-2 is activated, by means of the status control signals on lines 24-2B and 24-2A.

The state data are set up in unit 10-1 by the memory change detector 28-1 which is responsive to the write signal on bus 16-1 to generate a record of the memory changes comprising at least the memory address and data present on bus 16-1 when a write operation is performed.

These records are provided through STATE DATA wires 40-1 of mirror bus 34 to the write ahead queue WAQ memory 32-2 in the backup unit 10-2, where they are accumulated. The active program running in processor 12-1 is not involved in this process.

The memory changes constitute the difference between the active and back up memory states. From now on, it is assumed that the processor state is equal to the memory state or in other words that the variables which determine the processor behavior from a point to later on the future must reside in memory exclusively.

The results are that the backup and active processors can be synchronized by applying the active memory changes to the backup memory.

At appropriate points of the working process performed by the program stored in memory 14-1, for example at the end of each task, the active program issues an ESTABLISH RECOVERY POINT ERP instruction. This instruction is not a new processor instruction. This may be for example a READ memory instruction specifying a memory address outside the memory address range or a memory address specially dedicated to the ERP instruction. The address will be referenced as ERP address. This address is detected by detector 28-1 which activates ERP line 42-1 in response thereto.

The active ERP signal on line 42-1 is provided to mirroring control circuit 30-2, which generates a SEPARATOR record which is written into the write ahead queue WAQ 32-2 through bus 43-2. Also, the mirroring control circuit 30-2 activates the read control line 44-2 to cause all records in the queue up to the most recently reached recovery point to be dumped into the memory 14-2 of the backup unit 10-2, as will be described later on.

During each computing stage, before the Establish Recovery Point instruction is issued, when the control program of the active processor determines the address of the entry point of the next computing stage, it issues a STORE instruction which causes the i entry point of the next computing stage (i.e. the address of the first instruction of the next comporting stage) to be stored at a fixed memory address referenced as Next Entry Point address.

This STORE operation will be detected as a memory change by memory change detector 28-1 and the corresponding memory change record is queued in the write ahead queue WAQ 32-2 to be loaded into the memory 14-2 of the backup unit 10-2.

If the program reaches a recovery point, a computing stage has been successfully executed by the active processor 12-1. The processor state is updated in the backup memory 14-2. If the active processor 12-1 fails before the program reaches a recovery point, the backup processor state is not updated and the value set up at the most recently reached recovery point is kept in the memory 14-2 at the Next Entry Point address.

When the status of the unit 10-2 is switched from backup to active under control of the configuration controller 22 and status handler 26-2, the processor program resident in memory 14-2 waits for the completion of the current dump operation into memory 14-2, if any, and starts executing the program at the instruction address which is read from the fixed Next Entry Point memory address.

The mirror bus 34 links the two units 10-1 and 10-2. It is used exclusively to allow the active processor to mirror its memory changes into the backup processor memory. Any kind of bus may be used provided that it presents the following capabilities:

1- It must be independent from the functional data paths of the units 10-1 and 10-2.

2- it must be directional with the direction under control of the statuses of the two processors. This capability has been schematically represented in FIG. 1 by the provision of STATE DATA wires 40-1 and ERP line 42-1 from memory change detector 28-1 to write ahead queue WAQ 32-2 and mirroring control circuit 30-2 and of STATE DATA wires 40-2 and ERP line 42-2 from memory change detector 28-2 to write ahead queue WAQ 32-1 and mirroring control circuit 30-1. Only the wires from the active processor to the backup processor are active. The other direction is inhibited for any other combination of statuses. Thus, the failing processor does not interfere with the active processor.

This function is shown schematically in FIG. 1 by the bus drive boxes 46-1 and 46-2 which are responsive to signals on lines 24-1A and 24-2A to control the direction of the transfers on the mirror bus 34, depending which processor 12-1 or 12-2 is active.

Figure 2:
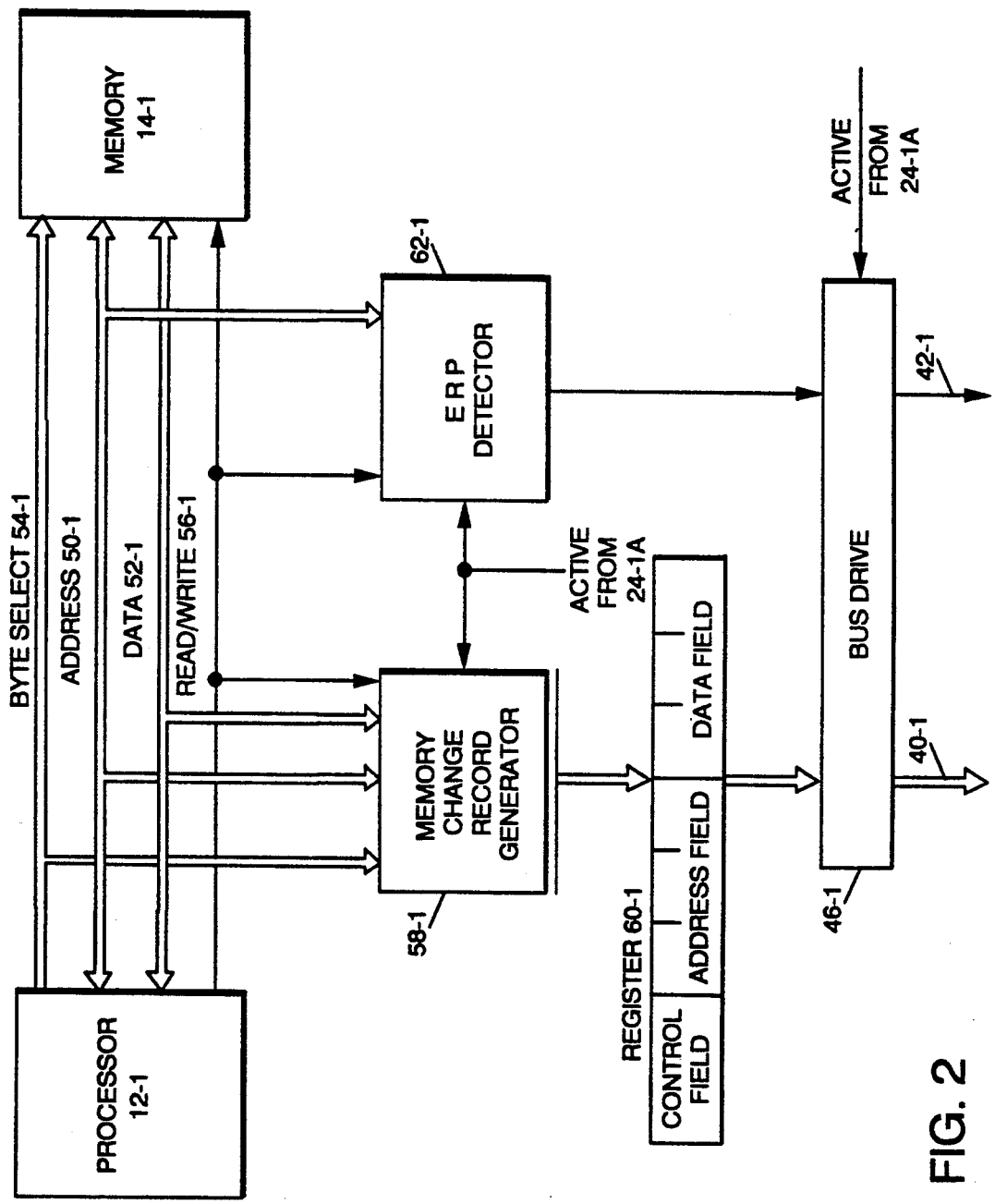
FIG. 2 represents a memory change detector circuit (28-1 of FIG. 1).

A memory change detector circuit 28 which may be used in units 10-1 and 10-2 is shown in FIG. 2. It is assumed that this circuit is the one located in the active unit 10-1, thus the suffix 1 is added to the reference numbers.

The memory bus 16-1 comprises address lines 50-1, data lines 52-1, byte select lines BS 54-1 and read/write R/W control line 56-1. It is assumed that the address lines are able to carry three bytes, the data lines are able to carry four bytes and that the memory is provided with a byte select capability allowing to update only selected bytes in the memory addressed location.

The address, data, byte select and read/write control lines of bus 16-1 are provided to a memory change record generator 58-1 which is active when the processor 12-1 is active. This record generator is responsive to the signal on R/W control line 56-1 indicative of a write memory operation to gate the address and data bits present on the address and data lines 50-1 and 52-1 into register 60-1 and generates a control field which is also provided to register 60-1. The control field contains information identifying this record as a memory change record and information derived from the byte select signal, specifying the bytes to be changed in the memory addressed location.

The memory change record generated in register 60-1 is provided through bus drive box 46-1 to be written into the write ahead queue 32-2.

An ERP detector 62-1 which is responsive to the signal on the R/W control line indicative of a read operation, and to the memory address in bus 50-1 being equal to the ERP address (meaning that the program issues the establish recovery point instruction) activate the ERP line 42-1 through the bus drive 46-1. This commits the memory change records stored up to that point in the write ahead queue 32-2.

The memory change detector operations are performed in real time.

Figure 3:
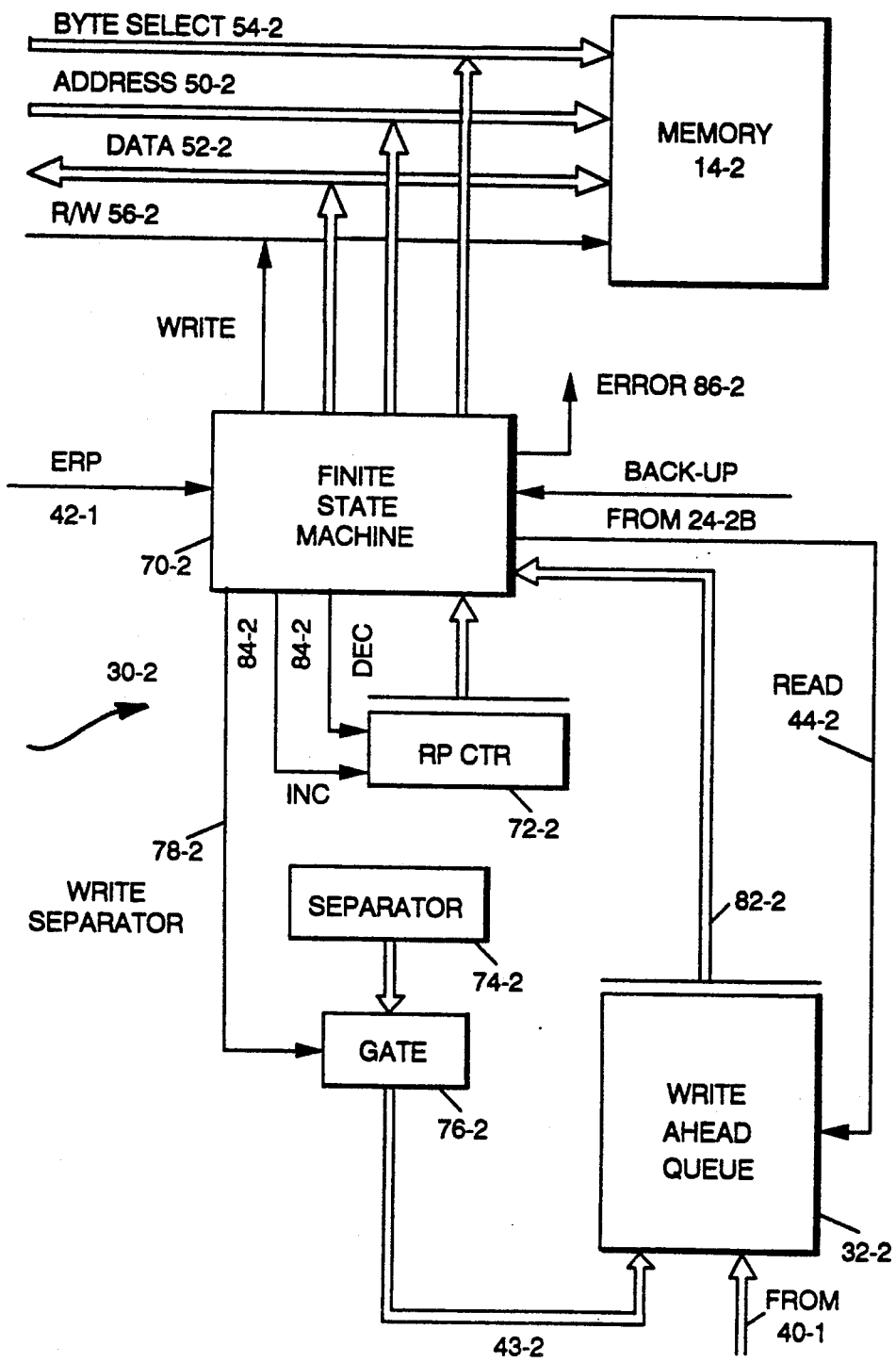
FIG. 3 represents a mirroring control circuit (30-2 of FIG. 1).

A write ahead queue 32 and a mirroring control circuit 30 are shown in FIG. 3. It is assumed that they are located in the backup unit 10-2, thus a suffix number 2 is added to the reference numbers in FIG. 3.

The write ahead queue WAQ is a dual-port memory with a write and read port and a first-in first-out FIFO access. It is used to temporarily queue the memory change records received from the bus 40-1. The queued records can be dequeued, i.e read and erased from the WAQ queue under control of the mirroring control circuit 32-2 as will be described later on. Concurrent read and write accesses are authorized since the WAQ queue memory is dual ported. Such memories are conventional.

The function of the mirroring control circuit 30-2 is to apply the memory changes accumulated in the WAQ queue 32-2 to the backup memory 14-2 when these changes have been committed by an active Establish recovery point ERP signal from ERP line 42-1.

The mirroring control circuit 30-2 comprises a finite state machine 70-2, a counter 72-2, a register 74-2 which contains a separator pattern which has the same format as a memory change record and is identified as such by a particular code in the control field, and a gating circuit 76-2.

Figure 4:
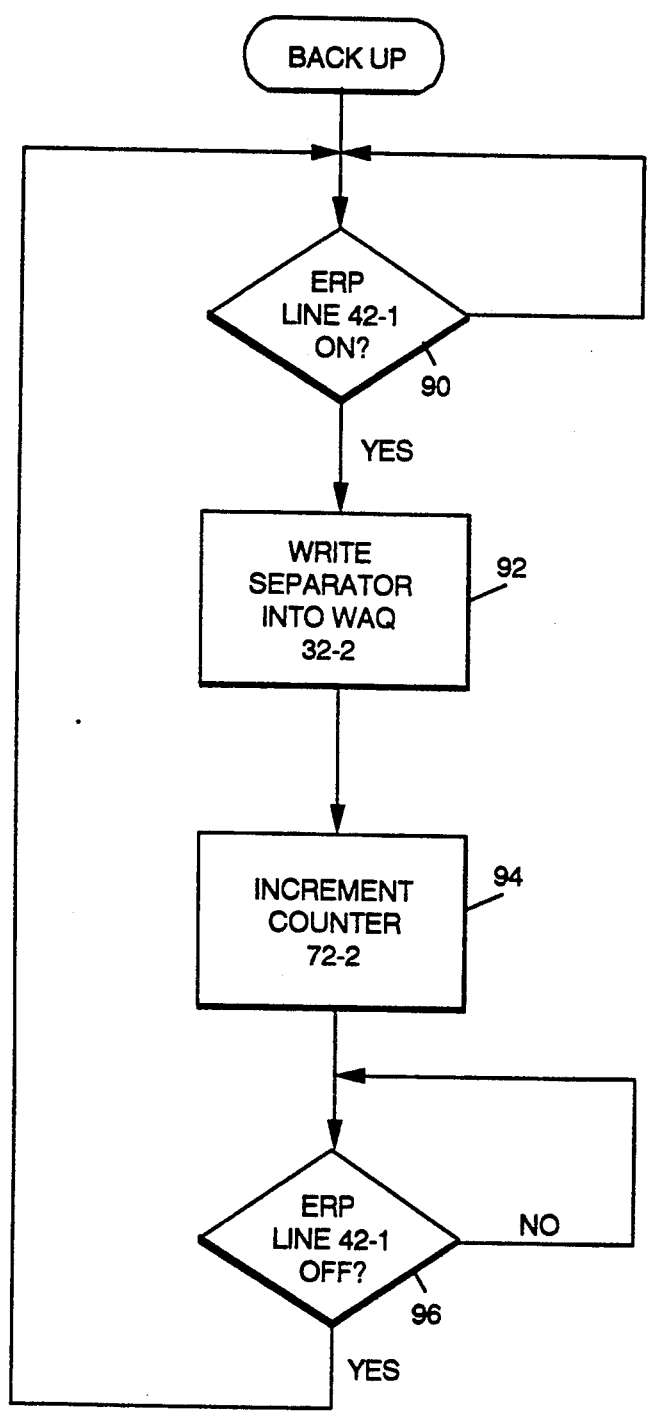
FIGS. 4 and 5 represent the state diagrams of the finite state machine in the mirroring control circuit.
Figure 5:
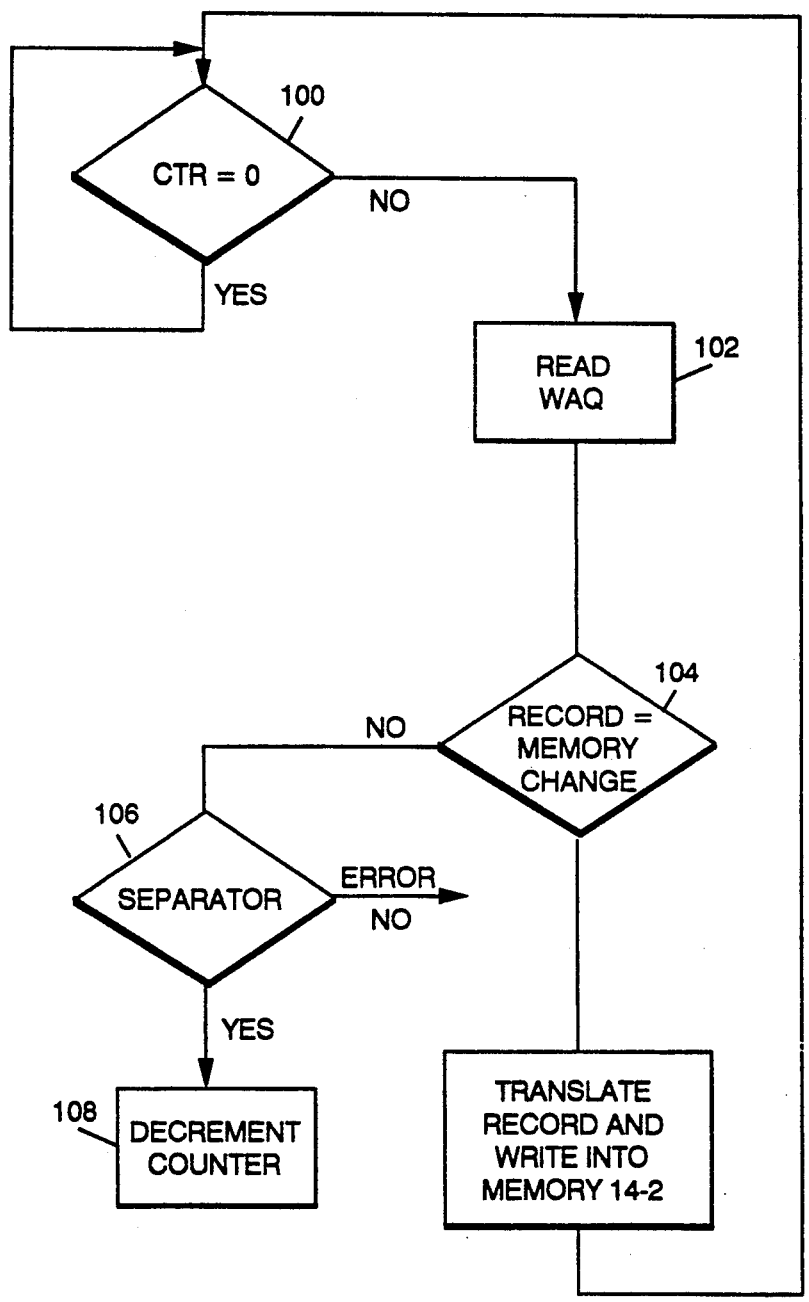

The state diagrams of the finite state machine 70-2 are shown in FIGS. 4 and 5. When the signal from line 24-2B sets unit 10-2 in the backup state, the finite state machine starts working. The first operation (operation 90) consists in testing the ERP line 42-1. If it is found active (ON), finite state machine 70-2 activates line 78-2, which causes the separator pattern contained in register 74-2 to be written into the write ahead queue 32-2 (operation 92). Then, finite state machine 70-2 activates increment line 80-2, which causes the counter 72-2 to be incremented by 1 (operation 94).

The counter value reflects the number of committed recovery points which are to be serviced by the mirroring control circuit.

Then, the ERP line 42-1 is tested again and, if it is found inactive, the process is resumed at operation 90. If not it is resumed at operation 96 in order to wait for the drop of the ERP signal.

As long as there are committed memory change records in the WAQ queue 32-2, the finite state machine 72-2 generates a read control signal on line 44-2 and receives the records read from the WAQ queue through bus 82-2 to translate them into the appropriate address, data and byte select information which are provided to memory bus 16-2, to update the backup memory 14-2. The mirroring control circuit 30-2 has a direct memory access capability, which means that it can access the memory without assistance from the processor 12-2.

The state diagram of machine 70-2 describing these operations is shown in FIG. 5.

First, the finite state machine 72-2 tests the value in counter 72-2 (operation 100) and waits until this value becomes different from 0, which means that committed the memory change records generated during a computing stage have been accumulated. When the counter value is different from 0, read line 43-2 is activated and a record is read from the WAQ queue (operation 102).

Then, finite state machine 70-2 tests whether this record is a memory change (operation 104). If yes, it translates the record and writes the corresponding memory change into the memory 14-2 (operation 106), then operation 100 is resumed.

If the read record is not a memory change, the finite state machine tests whether this record is a separator record (operation 106). If yes, it activates line 84-2 which causes the content of counter 72-2 to be decremented (operation 108), since the memory change data corresponding to a computing stage have been dumped into the backup memory 14-2.

If no, an error signal is raised on line 86-2.

Though these operations 90 to 108 could be performed in the backup processor, they are preferably performed by a finite state machine, which is a hardwired logic circuit, to match the speed at which the memory changes may occur.

When the status of the processor 12-2 is switched from backup to active, the processor issues an input-/output instruction: READ RP COUNTER 72-2 to determine if all the committed memory changes queued in the WAQ queue have been serviced. A read of the RP counter 72-2 followed by a test for zero allows it to do that operation. If the RP counter is not at 0, the processor waits for the monitoring control circuit 30-2 completes the copy of the memory changes in the memory 14-2. When counter is at 0, the processor 12-2 issues a READ instruction at memory Next Entry Point address to get the address of the first instruction to be executed by processor 12-2 to resume the working process interrupted by the failure in processor 12-1.

The status handlers 26-1 and 26-2 in FIG. 1 receive the status control signals from the configuration controller 22.

They force interrupts to the processors in response to the switching order from the FAIL status to BACKUP status, from the BACKUP to ACTIVE status or from the FAIL to ACTIVE status as indicated by the status control signals on status control busses 24-1 and 24-2. These interrupts notify the interrupt causes to the processor programs in order that the program be set idle when the processor is to be set in the BACKUP status or starts running when the processor is to be set in the ACTIVE status.

Figure 6:
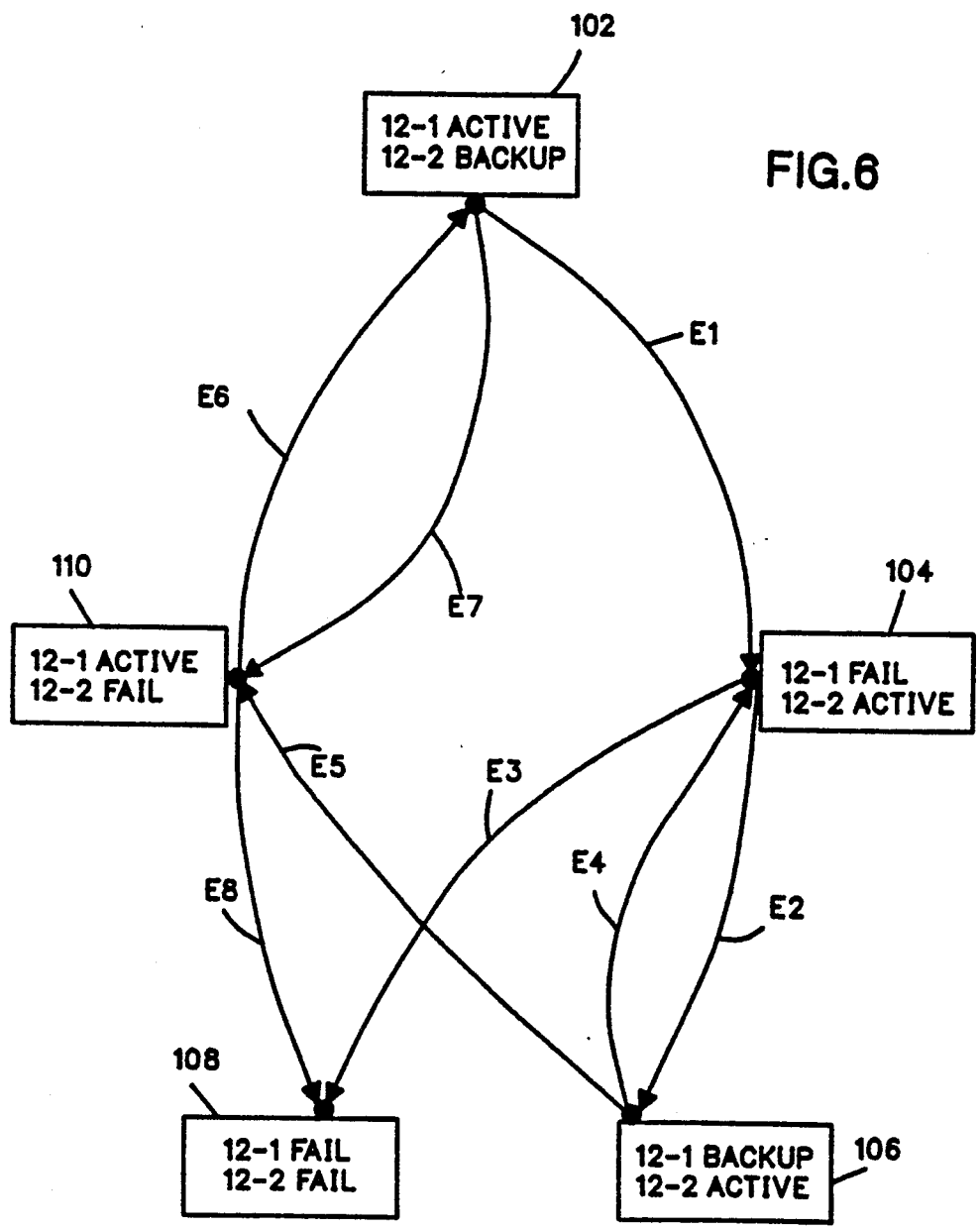
FIG. 6 represents the state diagram of the configuration controller.

Configuration controller 22 also comprises a finite state machine which activates the line of busses 24-1 and 24-2, as shown in FIG. 6.

There are five possible states for the processors 12-1 and 12-2, which are set by configuration controller 22. The states are shown in boxes 102, 104, 106, 108 and 110 in FIG. 6. The table hereunder indicate the status of the lines 24-1A, 24-1B, 24-1F, 24-2A, 24-2B and 24-2F for setting the processors 12-1 and 12-2 in the five states.

| State | Proc. 12-1 | Proc. 12-2 | 24-1A | 24-1B | 24-1F | 24-2A | 24-2B | 24-2F |
|---|---|---|---|---|---|---|---|---|
| 102 | Active | Backup | ON | OFF | OFF | OFF | ON | OFF |
| 104 | Fail | Active | OFF | OFF | ON | ON | OFF | OFF |
| 106 | Backup | Active | OFF | ON | OFF | ON | OFF | OFF |
| 108 | Fail | Fail | OFF | OFF | ON | OFF | OFF | ON |
| 110 | Active | Fail | ON | OFF | OFF | OFF | OFF | ON |

The events which cause the switching from one state to another state are shown by the arrows in FIG. 6. For example, when the processors are in state 102, which means that processor 12-1 is the active processor and processor 12-2 is the backup processor, the configuration controller sets the state 110 if processor 12-2 fails.

The event which causes the switching from state 102 to state 110 is the switching of line 20-2 from the OFF to the ON status while line 20-1 is OFF.

All the possible events which cause the states to be switched are shown below.

| SWITCHING | | |
|---|---|---|
| FROM | TO | EVENT |
| 102 | 104 | E1 = 20-1 OFF → ON 20-2 OFF |
| 104 | 106 | E2 = 20-1 ON → OFF 20-2 OFF |
| 104 | 108 | E3 = 20-2 OFF → ON 20-1 ON |
| 106 | 104 | E4 = 20-1 OFF → ON 20-2 OFF |
| 106 | 110 | E5 = 20-2 OFF → ON 20-1 OFF |
| 110 | 102 | E6 = 20-2 ON → OFF 20-1 OFF |
| 102 | 110 | E7 = 20-2 OFF → ON 20-1 OFF |
| 110 | 108 | E8 = 20-1 OFF → ON 20-2 ON |

So as to allow any unit (10-1 or 10-2) to be initially set in active or backup status, a memory change detector, a mirroring control circuit and a write ahead queue are associated to each unit. This gives flexibility to the system.

Obviously, if this flexibility is not desired, i.e. if a unit is the normally active unit and the other one 10-2 is the normally back up unit, only one memory change detector 28-1 and one write ahead queue (32-2) and one mirroring control circuit 30-2 are required.

In order to optimize the processor utilization, the backup processor can be used for running another program stored in the memory in an address space which is distinct from the address space dedicated to the backup function.

Figure 7:
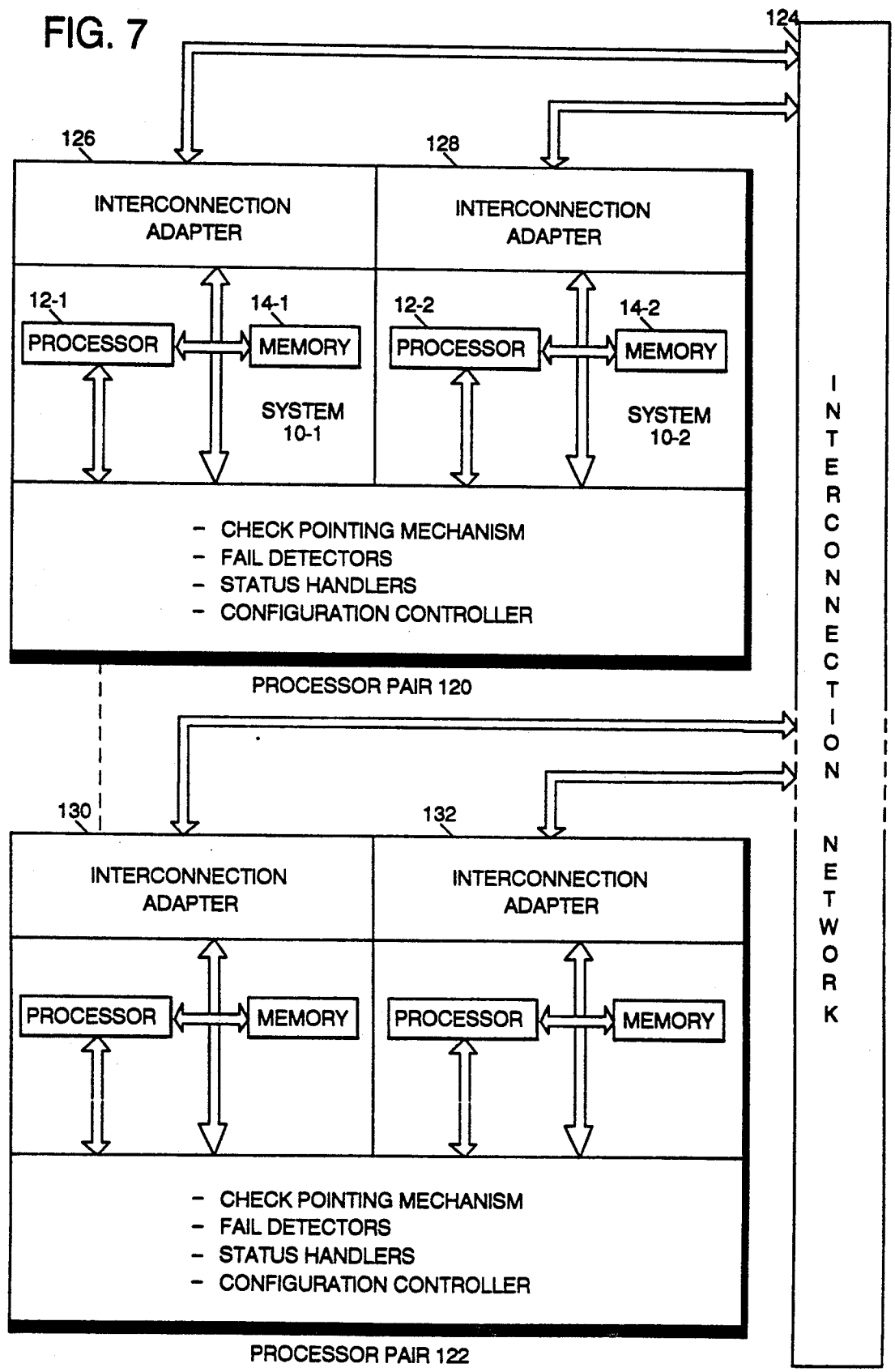
FIG. 7 represents the checkpointing mechanism when implemented in a multiprocessor system having processor pairs connected to one another through an interconnection network.
Figure 8:
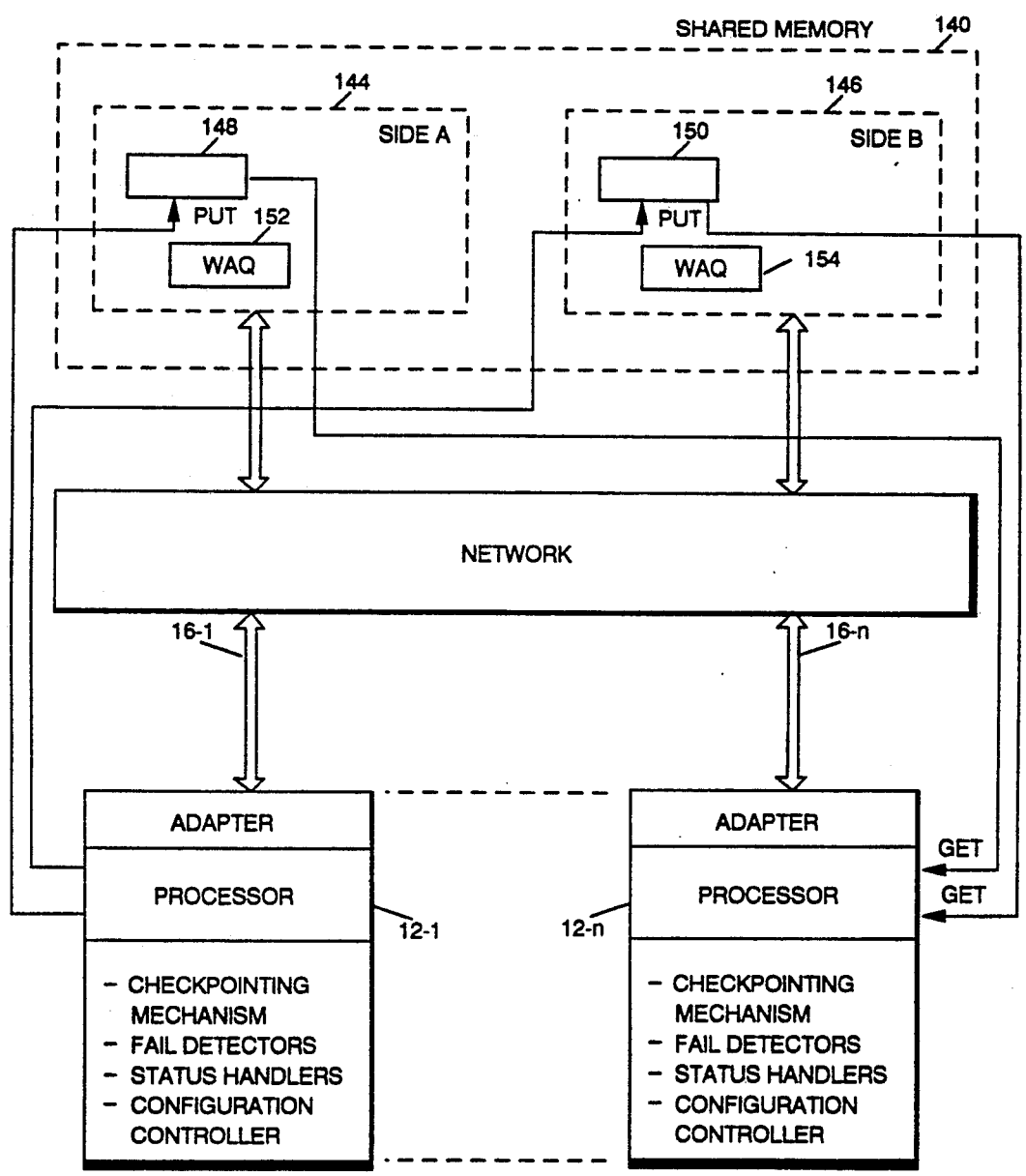
FIG. 8 represents another implementation of the checkpointing mechanism, wherein several single processors are interconnected through a shared intelligent memory.

As stated above, the checkpointing mechanism described in reference to FIGS. 1 to 6, can be implemented in a multiprocessor system as shown in FIG. 7. Only two processor pairs 120 and 122 are represented in this Figure. As schematically shown in FIG. 7, the processors, memories, checkpointing mechanism, fail detector circuits, status handlers and configuration controller of each pair are arranged as shown in FIG. 1.

The processor pairs are interconnected through an interconnection network 124 which is assumed to be fault free.

The processors communicate between them through messages exchanged via the interconnection network. The communication messages are generated by the active processor of the source pair to the active processor of the destination pair.

The messages are exchanged from the memory of the active source processor to the memory of the active destination processor via interconnection adapters making the interfaces between the memory busses and the interconnection network, these adapters are schematically shown as 126, 128, 130 and 132 boxes.

The backup processor in the destination pair does not directly receive the messages through the interconnection network but gets them through the checkpointing mechanism.

The implementation of the checkpointing mechanism in this multiprocessor environment implies that the interconnection network has an addressing scheme which identifies the processor pairs and not the individual processors so that the sender does not have to know which particular processor in the destination pair is active.

The processor to processor communication must be protected against the message loss or duplication resulting from a processor failure by an appropriate error recovery protocol.

The "Establish Recovery Point" action must not be issued by the program while a message in or message out operation is underway. A message in or message out operation cannot therefore overlap several computing stages and a fail in the active processor leads to the following:

if a message out was performed during the aborted comprising stage, the message out operation will be reissued by the new active processor based upon the memory state at the last recovery point;

if a message in was performed during the aborted computing stage, the message in will be ignored by the new back up processor and will be resent by the sender.

As stated above, the check pointing mechanism described in reference to FIGS. 1 to 6 can further be implemented in a multiprocessor system as shown in FIG. 8.

FIG. 8 shows a plurality of processors 12-1, 12-2, ..., 12-n connected to a shared memory (140), which is of the type of the shared memory described in European patent application No. EP 88480102.8 of same applicant, incorporated herein by reference. The processors are connected to the shared memory through an interconnection network (142). The shared memory (140) comprises two sides: side A (144) and side B (146), wherein the same information are duplicated in order to provide a hardened storage, for data integrity.

As explained in detail in the above mentioned patent application, to communicate with each other, the processors (12-1, ..., 12-n) exchange messages using queues of records located in the shared memory, via appropriate high level commands. The high level commands (PUT, GET, ENQ, DEQ) sent by the processors are built up by memory interfaces (156) connected to said processor, and transmitted through the interconnection network (142) to a memory command executor (PMCE, not shown) integrated in the shared memory, for executing the high level commands. Said high level commands work with data records identified by Logical Record Addresses (LRA) known by the processors. During execution of the high level commands by the PMCE, the Logical Record Addresses are translated into physical addresses corresponding to physical address space in the sides of the shared memory.

As shown in FIG. 8, any data structure, schematized by a duplicated record (148, 150) in the memory (140), is duplicated in order to support any single hardware fault in the storage or in the access system. In particular, a recovery point established for a task, as defined in relation to the present invention, is always saved in the memory as a duplicated record rather than an address space of a single memory dedicated to reach processor, as described in relation to FIGS. 1 to 6. Thus, a recovery point benefits from the protection provided by the duality of the memory (140) structure.

Similarly, rather than affecting a dedicated Work Ahead Queue (WAQ) to each processor, as described in relation to FIGS. 1 to 6, the implementation shown in FIG. 8 provides for duplicated Write Ahead Queue records (152, 154) located in the sides (144, 146) of the memory (140). The remaining features of the checkpointing mechanism according to the invention, i.e. the fail detector, status handler, and configuration controller functions, are dedicated to each processor (12-1, 12-4), and are operated as previously described.

However, due to the use of a shared memory connected to all the processors, the establishment of a recovery point located in the packet memory is somewhat specific, because of the duplicated nature of the memory sides (144, 146).

At the lowest level, a recovery point for a task is a set of data records (148, 150) located in dual address spaces. If the update of the recovery point were done in parallel in both sides (144, 146), the same false values would be stored in both sides, in case of a crash of a processor during a PUT operation. For instance, if a recovery point is defined by 8 bits, a crash during a PUT operation could leave the false value nnnnnOOO as a new recovery point, in both sides of the packet memory (where n represents a bit of the new recovery point value, and 0 represents a bit of the old recovery point value).

Thus, to remedy to this problem when the checkpointing mechanism is implemented using a shared memory, it would be necessary to de-synchronize the update of the two sides of the shared memory, in order to always have a consistent recovery point in at least one of the memory sides (144, 146).

In an environment using the shared memory as explained above, the commit phase, consisting in saving the data states created between two recovery points in a kind of cache, or commit list materialized by the Write Ahead Queues, comprises the steps of:

1. Saving the commit list in the Write Ahead Queues located in records of the shared memory (140).
2. Updating the side A (144) of the shared memory (140) with the latest recovery point.
3. Updating the side B (146) of the shared memory with the latest recovery point.

It is to be noted that, as long as the latest recovery point is not saved in both sides of the shared memory, the execution of a task by a processor must not modify the data states outside this processor. Therefore, all the external actions generated by the task execution are either saved in the commit list as previously explained, or executed immediately but logged into an Undo List saved in the shared memory. Thus, any external operation and its result can be annihilated in the occurrence of a failure while the task is executing in the processor. Under such circumstances, the execution of the undo list to erase the work of the task would be followed by the steps of getting the previous recovery point from the packet memory, and restarting the task with the data provided by said previous recovery point in compliance with the checkpointing scheme described in relation to FIGS. 1 to 6. It is to be noted that, due to the dual saving of the previous recovery point in two sides of the shared memory, the recovery procedure would slightly vary according to the moment of the occurrence of a processor failure, respective to the steps of the commit phase.

Thus, if the failure occurs during the phases 1 or 2 as previously defined, the new recovery point is not yet present in side A of the packet memory, and therefore the recovery procedure has to start from the old recovery point and will perform the steps of:

a) coping the old recovery point stored in side B, into side A.

b) executing the Undo List, to erase the external sections already performed using the new recovery point.

And, if the failure occurs during phase 3 as previously defined, the new valid recovery point is already stored in side A of the packet memory, and therefore the recovery procedure has to start from the new recovery point, and will perform the steps of:

a) copying the new recovery point which is in side A, into side B.

b) executing the Commit List.

It is to be noted that, since the recovery procedure is performed by a backup processor, it is mandatory to save in the shared memory, an information corresponding to the phase in which the main processor was when it failed.

We claim:

1. A checkpointing mechanism allowing the working process of an active processor to be resumed by a backup processor when the active processor is failing, said checkpointing mechanism being associated with at least one pair of information processing units comprising a first and a second information processing units (10-1 and 10-2), each information processing unit including a processor (12-1, 12-2) which runs a program stored in a memory (14-1,14-2) attached to the processor through a memory bus (16-1, 16-2) comprising data, address and control lines and which can be set in an active, backup or fail status under control of a configuration controller (22) responsive to failure detecting means (18-1, 18-2) associated to each processor and detecting whether the associated processor is failing or not, the checkpointing mechanism being characterized in that it comprises:

first memory change detecting means (28-1, 28-2) associated with at least the information processing unit (12-1, 12-2) whose processor is initially set in the active status by the configuration controller to receive the address and data on the memory bus causing the memory content to be changed and generate memory change records therefrom, first signalling means in said information processing unit whose processor is initially set in the active status by the configuration controller, responsive to a signal provided by said processor at selected points of the program to generate an establish recovery point signal, first storing means (32-1, 32-2) associated with at least the information processing unit whose processor is initially set in the backup status by the communication controller, said first storing means being coupled to said first memory change detecting means to store the memory change records received from said first memory change detecting means, first control means (30-1, 30-2) associated with said first storing means and responsive to the establish recovery point signal received from the first signalling means to cause a separating record to be stored in the first storing means and the memory change records to be read from the first storing means and written in the memory of the information processing unit whose processor is initially set in the backup status, as long as separating records are stored in the first storing means, whereby when set in an active status, the backup processor can resume the working process of the active status processor when its status is switched from the active status to the fail status.

2. Checkpointing mechanism according to claim 1 characterized in that it comprises:

second memory change detecting means (28-1, 28-2) associated with the information processing unit whose processor is initially set in the backup status by the configuration controller and is able to receive the address and data on the memory bus causing the memory content to be changed and generate memory change records therefrom, second signalling means in said information processing unit whose processor is initially set in the backup status by the configuration controller, able to generate an establish recovery point signal, in response to a signal provided by said processor at selected prints of the program, second storing means (32-1, 32-2) associated with the information processing unit whose processor is initially set in the active status by the communication controller, said second storing means being coupled to said second memory change detecting means to store the memory change records received from said second memory change detecting means, second control means (30-1, 30-2) associated with said second storing means and responsive to the establish recovery point signal received from the second signalling means to cause a separating record to be stored in the second storing means and the memory change records to be read from the second storing means and written in the memory of the information processing unit whose processor is initially set in the active status, whereby any one of said processors in the first and second information processing units can be initially set in the active or backup status by the configuration controller.

3. Checkpointing mechanism according to claim 2, characterized in that said memory (14-1, 14-2) and said first and second storing means (32-1, 32-2) are constituted by dual shared records (148, 150, 152, 154) duplicated in two sides (144, 146) of a memory (140) shared by said active and backup processors.

4. A checkpointing mechanism according to claim 2, characterized in that the first or second memory change detecting means, and the first or second signalling means are set in operation when their associated processor is set in its active status by the configuration controller, and the first or second storing means and the first or second control means are set in operation when their associated processor is set in its backup status by the configuration controller.

5. Checkpointing mechanism according to claim 1, characterized in that the first storing means comprise a dual-port first-in-first-out memory wherein the memory change records received from the first memory change detecting means are queued.

6. Checkpointing mechanism according to claim 4 characterized in that:

the first storing means comprise a dual-port first-in-first-out memory wherein the memory change records received from the first memory change detecting means are queued, the second storing means comprise a dual-port first-in-first-out memory wherein the memory change records received from the second memory change detecting means are queued.

7. Checkpointing mechanism according to claim 1 or 5, characterized in that the first control means comprises:

counting means (72-2), logic circuit means (70-2) responsive to the establish recovery point signal to cause the counting means to be changed by a first fixed value (+1) from an initial value (0) and generate the separating record to be written into the first storing means, said logic circuit means being responsive to the value of the counter to cause the first storing means to be read if said value is different from the initial value and the read record to be tested, and sent to the memory of the information processing unit if this record is a memory change record or the counter value to be changed by a second fixed value (−1) which is the opposite of the first fixed value if the record is a separating record.

8. Checkpointing mechanism according to claim 1 or 2, characterized in that the first and second control means comprises:

counting means (72-2), logic circuit means (70-2) responsive to the establish recovery point signal to cause the counting means to be changed by a first fixed value (+1) from an initial value (0) and generate the separating record to be written into the first storing means, said logic circuit means being responsive to the value of the counter to cause the associated storing means to be read if said value is different from the initial value and the read record to be tested, and sent to the memory of the associated information processing unit if this record is a memory change record or the counter value to be changed by a second fixed value (−1) which is the opposite of the first fixed value if the record is a separating record.

9. Checkpointing mechanism according to claim 1 characterized in that a means associated with the active processor sends the address of the program instruction at which the backup processor will have to resume the working process, through the memory bus so that this address constitutes a memory change record which is written into the memory of the processor set in the backup status at a fixed address.

* * * * *